United States Patent
Ackley et al.

(10) Patent No.: US 10,223,626 B2
(45) Date of Patent: Mar. 5, 2019

(54) HIGH AMBIENT LIGHT ELECTRONIC SCREEN COMMUNICATION METHOD

(71) Applicant: Hand Held Products, Inc., Fort Mill, SC (US)

(72) Inventors: H. Sprague Ackley, Seattle, WA (US); Damien Francou, Lynnwood, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 7 days.

(21) Appl. No.: 15/491,383

(22) Filed: Apr. 19, 2017

(65) Prior Publication Data

US 2018/0307957 A1 Oct. 25, 2018

(51) Int. Cl.
*G06K 19/06* (2006.01)
*G06K 7/14* (2006.01)
(Continued)

(52) U.S. Cl.
CPC ...... *G06K 19/06112* (2013.01); *G06K 7/1413* (2013.01); *G06K 19/06028* (2013.01);
(Continued)

(58) Field of Classification Search
CPC .............................................. G06K 19/06112
See application file for complete search history.

(56) References Cited

U.S. PATENT DOCUMENTS

| 5,535,147 A | 7/1996 | Jacobs et al. |
| 5,652,602 A | 7/1997 | Fishman et al. |

(Continued)

FOREIGN PATENT DOCUMENTS

| WO | 2013163789 A1 | 11/2013 |
| WO | 2013173985 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Christie L Marshall
(74) *Attorney, Agent, or Firm* — Additon, Higgins & Pendleton, P.A.

(57) ABSTRACT

The present invention embraces a method to obtain barcoded information off a computer screen under high ambient lighting conditions, including a direct sunlight environment. The method includes a user prompting a computer to present an active window on all or a portion of its screen. The computer generates a communication sequence, comprising information commonly included on a barcode, and displays the communication sequence on the computer screen. After activating the scanner into an alternative or screen mode, the user places the scanner on the active window of the computer screen and the scanner asynchronously receives the communication sequence. The scanner decodes the received communication sequence and obtains encoded information of the computer. The encoded information may include a unique identifier of the computer, such as a MAC address. With the MAC address, the scanner may wirelessly communicate with the computer to exchange other information.

19 Claims, 7 Drawing Sheets

(51) Int. Cl.
*H04W 76/14* (2018.01)
*H04L 29/12* (2006.01)
*H04W 4/80* (2018.01)

(52) U.S. Cl.
CPC ......... *H04W 76/14* (2018.02); *H04L 61/6022* (2013.01); *H04W 4/80* (2018.02)

(56) References Cited

U.S. PATENT DOCUMENTS

| | | | |
|---|---|---|---|
| 6,281,820 B1 * | 8/2001 | Fields ................. | H03M 1/32 341/137 |
| 6,832,725 B2 | 12/2004 | Gardiner et al. | |
| 7,128,266 B2 | 10/2006 | Zhu | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,249,209 B2 | 8/2012 | Zimman et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |

(56) References Cited

U.S. PATENT DOCUMENTS

| | | | |
|---|---|---|---|
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 9,775,101 B2 * | 9/2017 | Beguin ............... H04W 48/16 |
| 2005/0254714 A1 | 11/2005 | Anne |
| 2007/0009268 A1 | 1/2007 | Giannopoulos |
| 2007/0063048 A1 | 3/2007 | Havens et al. |
| 2008/0035734 A1 * | 2/2008 | Challa ................. G06K 7/10 235/462.46 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0080530 A1 | 4/2011 | Koo |
| 2011/0114717 A1 * | 5/2011 | Yu ..................... G06K 7/1095 235/375 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |

(56) References Cited

U.S. PATENT DOCUMENTS

| | | |
|---|---|---|
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0245281 A1* | 8/2015 | Beguin ................ H04W 48/16 370/255 |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0021346 A1* | 1/2016 | Liu ..................... H04N 9/3105 348/744 |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0132708 A1* | 5/2016 | Tsou ..................... G06Q 30/02 235/462.1 |
| 2016/0133253 A1 | 5/2016 | Braho et al. |
| 2016/0171720 A1 | 6/2016 | Todeschini |

(56) References Cited

U.S. PATENT DOCUMENTS

| | | | |
|---|---|---|---|
| 2016/0178479 | A1 | 6/2016 | Goldsmith |
| 2016/0180678 | A1 | 6/2016 | Ackley et al. |
| 2016/0189087 | A1 | 6/2016 | Morton et al. |
| 2016/0125873 | A1 | 7/2016 | Braho et al. |
| 2016/0227912 | A1 | 8/2016 | Oberpriller et al. |
| 2016/0232891 | A1 | 8/2016 | Pecorari |
| 2016/0292477 | A1 | 10/2016 | Bidwell |
| 2016/0294779 | A1 | 10/2016 | Yeakley et al. |
| 2016/0301924 | A1* | 10/2016 | Tay ............. G06K 7/1095 |
| 2016/0306769 | A1 | 10/2016 | Kohtz et al. |
| 2016/0314276 | A1 | 10/2016 | Sewell et al. |
| 2016/0314294 | A1 | 10/2016 | Kubler et al. |
| 2017/0177939 | A1* | 6/2017 | Beall ............ G06K 9/00671 |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Auguemented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

\* cited by examiner

HIGH AMBIENT LIGHT ELECTRONIC SCREEN COMMUNICATION METHOD

FIELD OF THE INVENTION

The present invention relates to methods of communicating with a computer, and in particularly methods of transferring information via screen communication to a bar code scanner in a high ambient light environment without the limitation of an in-focus optics system.

BACKGROUND

Generally speaking, the proliferation of 2D Imagers and their ease of operation have increased the demand for reading barcode symbols off a computer screen. Reading on-screen barcodes allows customers to take advantage of their inherent ability to be dynamically-created and therefore accommodate variable data, such as PC-specific Bluetooth MAC addresses. These techniques may support mission-critical applications such as package delivery. However, this process may break down in high ambient light environments. Often, the computer screen is located where significant and uncontrollable amounts of ambient light are flooding the screen, making the on-screen barcodes unusable.

Therefore, a need exists for a method to obtain the barcoded information off a computer screen under high ambient lighting conditions.

SUMMARY

Accordingly, in one aspect, the present invention embraces a method to transmit data between a computer screen and a decoding device utilizing an asynchronous communication method and an out-of focus condition for the decoding device. The data may be information which may have been encoded in a barcode and the decoding device may be a barcode scanner. The method may operate in a high ambient lighting environment, such as direct sunlight.

In an exemplary embodiment, the method of communicating with a computer may comprise activating a scanner to operate in a screen mode (or an alternative mode); and placing the scanner in contact with an active window displayed on a screen of the computer. The computer receives a prompt to cause the active window to be displayed on the screen, and the computer displays a communication sequence on the active window. The method continues with the scanner scanning the active window to asynchronously receive the communication sequence that comprises encoded information. The scanner operates in a defocused focus condition of the scanner and can operate successfully in a direct sunlight environment. The method further continues with the scanner converting the received encoded information to a unique identifier of the computer; and connecting the scanner to the computer using the unique identifier via an electronic communication method. The communication sequence comprises at least three optical states.

The active window is displayed on a portion of the screen of the computer. The unique identifier of the computer may be, but is not limited to, a MAC address. The electronic communication method may utilize, but is not limited to, a Bluetooth Low Energy (LE) technology.

In another exemplary embodiment, a method of communicating with a computer with a screen may comprise scanning, with a scanner, to detect a magnitude of an output of the screen, converting, by the scanner, the output of the screen into encoded information; and coupling the scanner to the computer using the encoded information. The computer causes all or part of the screen to display the output. The encoded information varies at least at a frame rate of the screen. The scanner operates independent of any focus condition. The output of the screen may be a multi-state sequence.

The scanner detects the magnitude of the output by averaging the pixels of the screen. The scanner may average all of the pixels of the screen. The scanner may use its internal CMOS sensor for this detection. The changing screen states enable asynchronous communications. The encoded information may comprise one or more instructions intended for the scanner. For example, the encoded information may include a MAC address. The scanner operates in a direct sunlight environment. The communication sequence may comprise a sequence of more than three optical states.

In yet another exemplary embodiment, a method of communicating with a computer may comprise receiving a prompt, at the computer, to cause a window to be displayed on a screen of the computer; displaying, by the computer, on the window a communication sequence comprising encoded information, wherein a scanner performs the steps of: (i) activating the scanner to operate in a screen mode) (or an alternative mode), (ii) placing the scanner in contact with the window, (iii) scanning the window with the scanner to asynchronously receive encoded information, and (iv) converting the received encoded information from the computer to a unique identifier of the computer. The method continues with the computer connecting the scanner to the computer using the unique identifier via an electronic communication method. The scanner operates independent of any focus condition of the scanner and operates independent of a direct sunlight environment. The communication sequence comprises a sequence of three optical states.

The aforementioned exemplary embodiments may include the following elements: The communication sequence may comprise a sequence of three optical states including an "on" state, an "off" state, and an intermediate state. On the active window, the "on" state is displayed as a white color, the "off" state is displayed as a black color, and the intermediate state is displayed as a gray color. At the "on" state or the "off" state, the communication sequence or multi-state sequence transitions to and from the intermediate state. At the intermediate state, the communication sequence or multi-state sequence transitions to and from either the "on" state or the "off" state. The "on" state, the "off" state or the intermediate state have at least a duration of a scanner frame rate. A transition from the intermediate state to the "on" or "off" state and back to a transition state comprises one bit of information. A transmission period for one bit is equal to two times a frame duration plus two times a sum of a rise time plus a fall time. The communication sequence or output is displayed by the computer onto the computer screen, or a portion of the computer screen.

In yet another exemplary embodiment, a method of communicating with a computer comprises activating a scanner to operate in a barcode mode. The scanner then attempts to decode a barcode displayed on a computer screen. If the scanner does not successfully decode the barcode: (i) the operation of the scanner changes to a screen mode, and (ii) the scanner proceeds to process a plurality of frames in a communication sequence displayed on the computer screen. The scanner then determines if the communication sequence comprises multiple states in the frames of the communication sequence.

If the communication sequence comprises multiple states, the scanner continues to decode the plurality of frames comprising bits of encoded information. After receiving and decoding a full bit stream, the operation of the scanner returns to the barcode mode. The scanner converts the encoded information to a unique ID of the computer, and proceeds to wirelessly connect to the computer using the unique ID.

In the barcode mode, if the scanner successfully decodes the barcode, the decoded barcode may be transmitted to a host computer. Then, the scanner repeats the operation in the barcode mode by attempting to decode another barcode. In the screen mode, if the communication sequence does not comprise multiple states, the operation of the scanner may be returned to the barcode mode.

In yet another exemplary embodiment, a method of obtaining a machine-readable code information with a barcode scanner from a digital display comprising the steps of: converting the machine-readable code information into a communication sequence comprised of sequential images, wherein each sequential image is defined by at least three colors or patterns; configuring the barcode scanner to operate in a manner that analyzes a plurality of images sequentially; displaying by the digital display the communication sequence; receiving with the barcode scanner the communication sequence, wherein the barcode scanner captures the sequential images; converting the captured sequential images back into the machine-readable code information; and connecting the barcode scanner to a computer using a unique identifier via an electronic communication method.

The communication sequence comprises a sequence of three optical states including an "on" state, an "off" state, and an intermediate state. Each optical state represents a different color. On the active window, the "on" state is displayed as a white color, the "off" state is displayed as a black color, and the intermediate state is displayed as a gray color. At the "on" state or the "off" state, the communication sequence transitions to and from the intermediate state; and at the intermediate state, the communication sequence transitions to and from either the "on" state or the "off" state. The "on" state, the "off" state or the intermediate state have at least a duration of a barcode scanner frame rate.

In yet another exemplary embodiment, a system for obtaining a machine-readable code information with a barcode scanner from a digital display, the system comprising: a computer capable of generating a multi-state sequence based on the machine-readable code information and presenting the multi-state sequence on the digital display; the barcode scanner capable of scanning the digital display and receiving the multi-state sequence using out-of-focus asynchronous data transmission, wherein, the barcode scanner converts the multi-state sequence back into the machine-readable code information; and the digital display for displaying the multi-state sequence.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a method to obtain barcoded information off a computer screen under high ambient lighting conditions, including a direct sunlight environment. The method includes a user prompting a computer to present an active window on all or a portion of its screen. The computer generates a communication sequence, comprising information normally included in a barcode, and displays the communication sequence on the computer screen. After activating the scanner into a screen mode (or an alternative mode), the user places the scanner on the active window of the computer screen and the scanner asynchronously receives the communication sequence. The scanner decodes the received communication sequence and obtains encoded information from the computer. The encoded information may include a unique identifier of the computer, such as a MAC address. With the MAC address, the scanner may wirelessly communicate with the computer to exchange other information. The other information may include tracking the location of product inventory in a facility.

The present invention may be useful in an industrial environment where a user is picking up a product from inventory and delivering it to a delivery location in the facility. To track the user's activity, the user first connects to a specific computer. The connection includes reading three bar codes. The first barcode resets the scanner; the second barcode reconfigures the scanner or operation; and the third barcode includes a unique identifier of the computer. The unique identifier may be a MAC address.

After connecting with the specific computer, the user may walk in the facility and pick up a product and deliver it to a delivery location in the facility. At each stop, the user reads the barcode of the product, which is immediately transmitted to the specific computer. Accordingly, the location of the product is tracked by the specific computer. The specific computer is often in a high ambient light environment. A work around for this situation may include posting the barcodes on a piece of paper and attaching the paper to the specific computer. The scanner may be able to read the barcode on the paper in a high ambient light environment, but the paper may become lost or damaged. The present invention provides a method to avoid such a work around.

As described, herein, a communication sequence is equivalent to a communication signal. An optical state is equivalent to a color. A scanner is equivalent to a barcode scanner. A communication sequence may be a multi-state sequence.

Figure 1A:
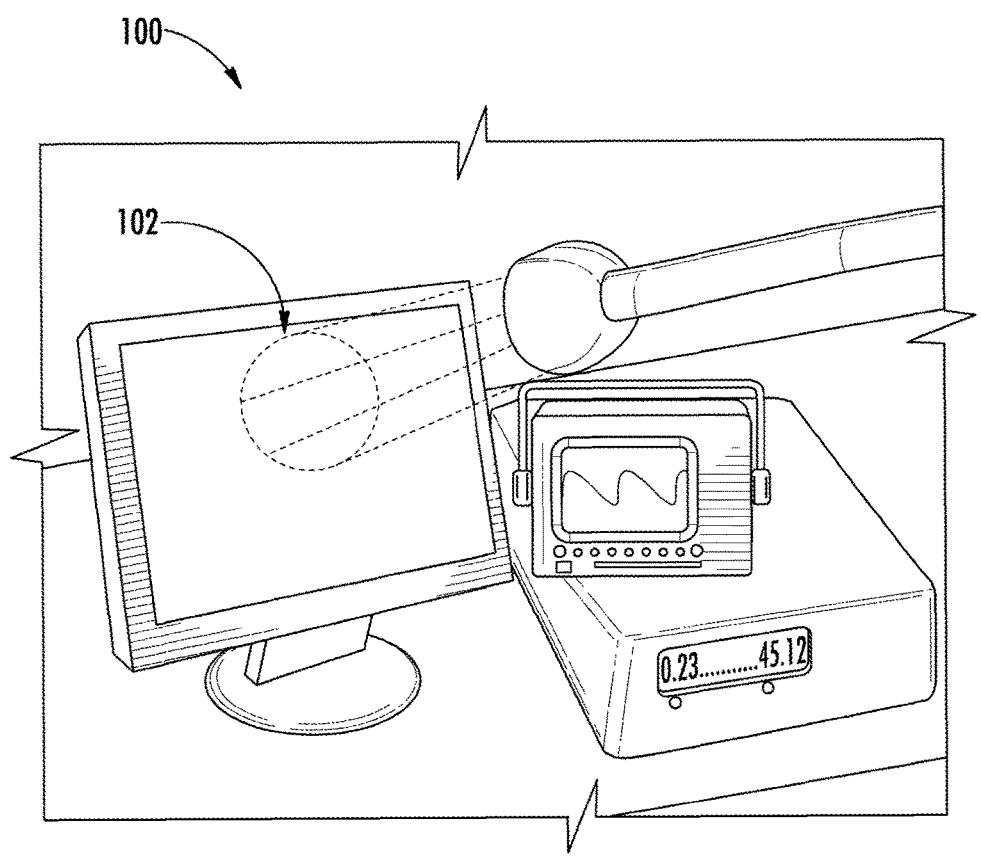
FIG. 1A illustrates a computer screen flooded with ambient light.

FIG. 1A illustrates an embodiment 100 of a computer screen flooded with ambient light 102. The high ambient light environment may inhibit a barcode scanner from reading a barcode on the computer screen. The present invention may solve this problem by creating a small "window" on the computer screen that changes light intensity uniformly, allowing the scanner to be in contact with the screen and to operate in any focus condition including out-of-focus.

Figure 1B:
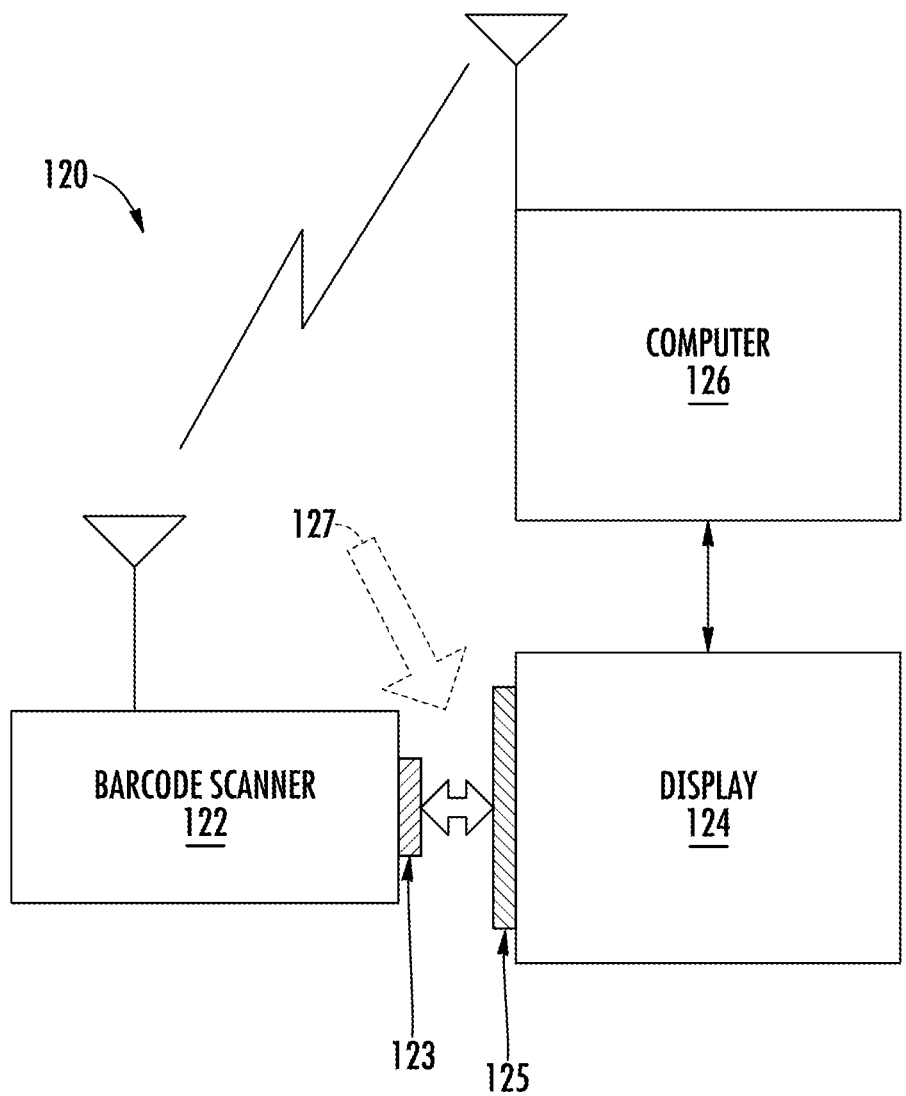
FIG. 1B illustrates a system for obtaining barcoded information off a computer screen under high ambient lighting conditions.

FIG. 1B illustrates a system 120 for obtaining barcoded information off a computer screen under high ambient lighting conditions, as depicted in FIG. 1A. System 120 comprises barcode scanner 122 that includes a scanner optical input/output (I/O) port 123, display 124 that includes a visual portion of the display 125, computer 126, and high ambient light 127. As illustrated, barcode scanner 122 attempts to reads a barcode off display 124 via the scanner optical I/O port 123 and visual portion of the display 125. Inasmuch as a successful reading of a barcode may not be possible, the user of barcode scanner 122 changes from a barcode reading mode to a screen scanning mode (or screen mode) and requests the computer 126 to display a communication sequence representing the barcode information. As illustrated, barcode scanner 122 can wirelessly communication with computer 126. Although not shown, barcode scanner 122 can communication with computer 126 on a non-wireless basis. A "screen mode" is sometimes referred to as an "alternative mode."

The present invention may also solve the problem of how to communicate information without using a method to synchronize to the computer screen. Other methods have relied on using the time-dependent rastering scans for each frame of a CRT display to transmit a byte and a focused photodiode to receive the information in a synchronized fashion. This CRT method may not be useful with current screen technology and may be very sensitive to high ambient light conditions. Also, the CRT method may use the entire frame to transmit a bit and the receiving device may need to be focused. In the present invention, the method of communicating information may not need to be synchronized and may not need to rely on time dependent frame generation. Moreover, the receiving device may be a standard imaging barcode scanner.

Figure 2:
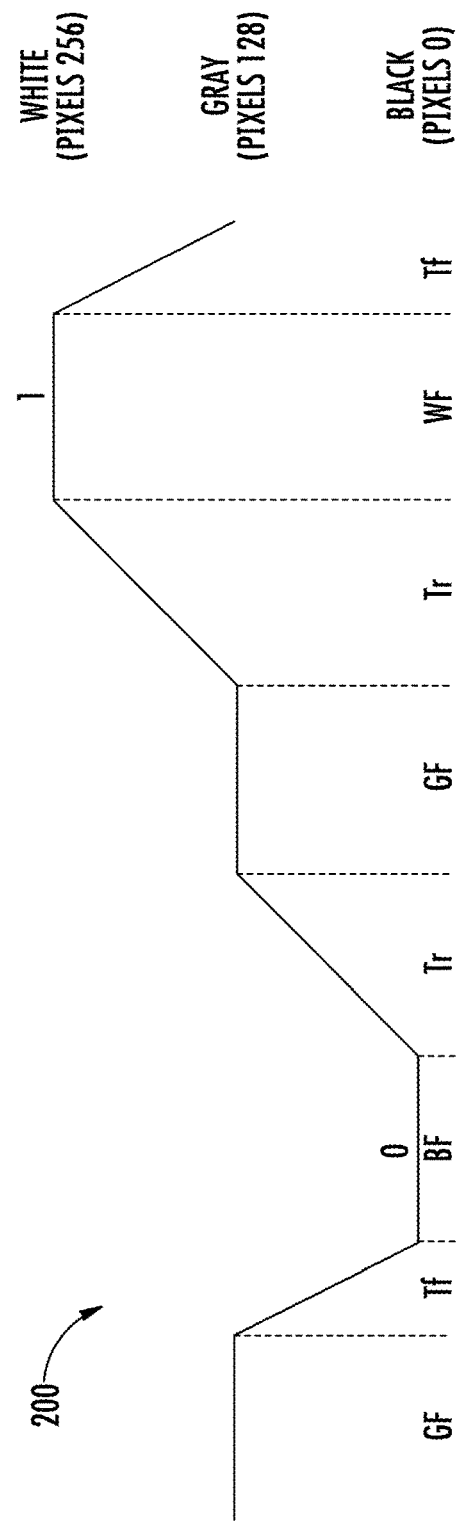
FIG. 2 illustrates an exemplary embodiment of a communication sequence that is displayed on the computer screen and subsequently scanned by a scanner in a high ambient light environment such as illustrated in FIG. 1A and FIG. 1B.

FIG. 2 illustrates an exemplary embodiment of a communication sequence 200 that is displayed, i.e., projected, on the computer screen and subsequently scanned by a scanner in a high ambient light environment such as illustrated in FIG. 1. The display or projection of communication sequence 200 may be on all or a designated area of the computer screen such as in the lower right corner of the computer screen.

The scanner, such as a Honeywell SF61, may run at 60 frames per second, meaning the scanner may capture a new image approximately every 17 ms (i.e., the frame duration, or Ts is 17 ms). This situation may limit the fundamental information transfer since a "bit" has to be captured during this time period. A "bit" may be defined when the screen is either all on or all off. An LCD screen, Honeywell CV61, may have a "rise" time of 36 ms and a "fall" time of 20 ms between the two optical states that comprise a bit. The problem becomes how to make sure that the scanner sees the "on" state without missing it, while at the same time being sure that the scanner does not capture the bit twice. One solution is to utilize an intermediate state where half the screen illumination is on and half off creating a gray level that may serve as a "catch up" zone both to be sure that at least one frame is caught and to know when two frames are caught so as to avoid a double count.

The definition of a bit is therefore a process where the screen transitions from gray to, all-white (i.e., "on") and stays "on" for approximately 17 ms, then transitions back to gray for approximately 17 ms. This method may allow for two "on states" of the same value to be adjacent, since they are separated by a gray period. This method may allow for two "on states" to be adjacent, but not separated by a gray value, thereby allowing the scanner to ignore one of the "on states". This method may also allow for the accounting of any intermediate point of the rise and fall of the screen.

FIG. 2 shows the method of the present invention diagrammatically, and specifically the encodation of two bits, 01, on the CV61 display screen as a function of time. The encodation starts on the left with a gray frame that may be long enough to be sure the scanner does not miss a frame. The frame duration may be 17 ms because in the worst case, the scanner captures a frame every 17 ms. Hence, the method may not miss the gray frame. The 10 ms is half the "fall" time (Tf) to the first "off state" that needs to stay at zero level (off=0) again for 17 ms. The 18 ms is half the screen's inherent "rise" time (Tr) to return to gray that allows the scanner to become ready to measure the next "on or off" state, which in this example may be 256 (on=1). An "on" state (white) means that all pixels (256) are turned on. An "off" state (black) means that no pixels (zero) are turned on. A gray level means that half the pixels (128) are turned on or all the pixels are set at an intermediate color, such as light blue.

FIG. 2 also shows the minimum times for display output on the CV61 display screen to generate two bits dependably. The "on" or white state must be of at least the duration of the scanner frame rate to be sure to capture it. There may be an intermediate state, gray, to distinguish between two adjacent "on" or "off" states. The ½ rise time (Tr) and ½ fall time (Tf) are inherent in the display and are 18 and 10 ms respectively in this exemplary embodiment.

The intermediate state (where half the screen illumination is on and half off) creates a gray level that serves as a neutral or "rest" condition, and provides a mechanism for bit synchronization.

The total time for transmission of a bit is 2(Ts)+2(Tr+Tf). For 2 bits=4(17 ms)+2 (10 ms+18 ms)=124 ms. For 40 bits=124×20=2.5 s. For 48 bits=124×24=3.0 s ("s"=second, "ms"=milli-second). Ts is the frame duration.

When the scanner receives the MAC address of the computer, the scanner may wirelessly communicate with the computer. As it turns out, there may be some repeating data in the MAC address for the CV61 that may be the same 6-digit prefix and may be 001040, which may basically identify the chipset vendor. For example, valid CV61 MAC addresses may be: 00104057a64c, 001040b6afe3, and 00104042d4a0. Consequently, six hex characters must be represented, which is three bytes or 24 bits, in order to be useful to the application. Check bits could be added as well as a gray prefix and still be within the practical range of about two seconds of contact time with the display screen.

In summary, FIG. 2 illustrates a communication sequence comprising a sequence of three optical states. The communication sequence includes 2 bits, a "01" bit pattern. The time to transmit 2 bits=(2GF+BF+WF)+2(Tr)+2(Tf), where GF=gray frame; BF=black frame; WF=white frame; Tr=½ rise time; Tf=½ fall time. For one embodiment: GF=BF=WF=17 ms; Tf=10 ms; Tr=18 ms. A rise time equals the rise from the black level to the white level; similarly for the fall time. Tr may be a different value than Tf. The number of pixels displayed is the bit state. In another exemplary embodiment, the communication sequence may comprise a sequence of more than three optical states.

Figure 3:
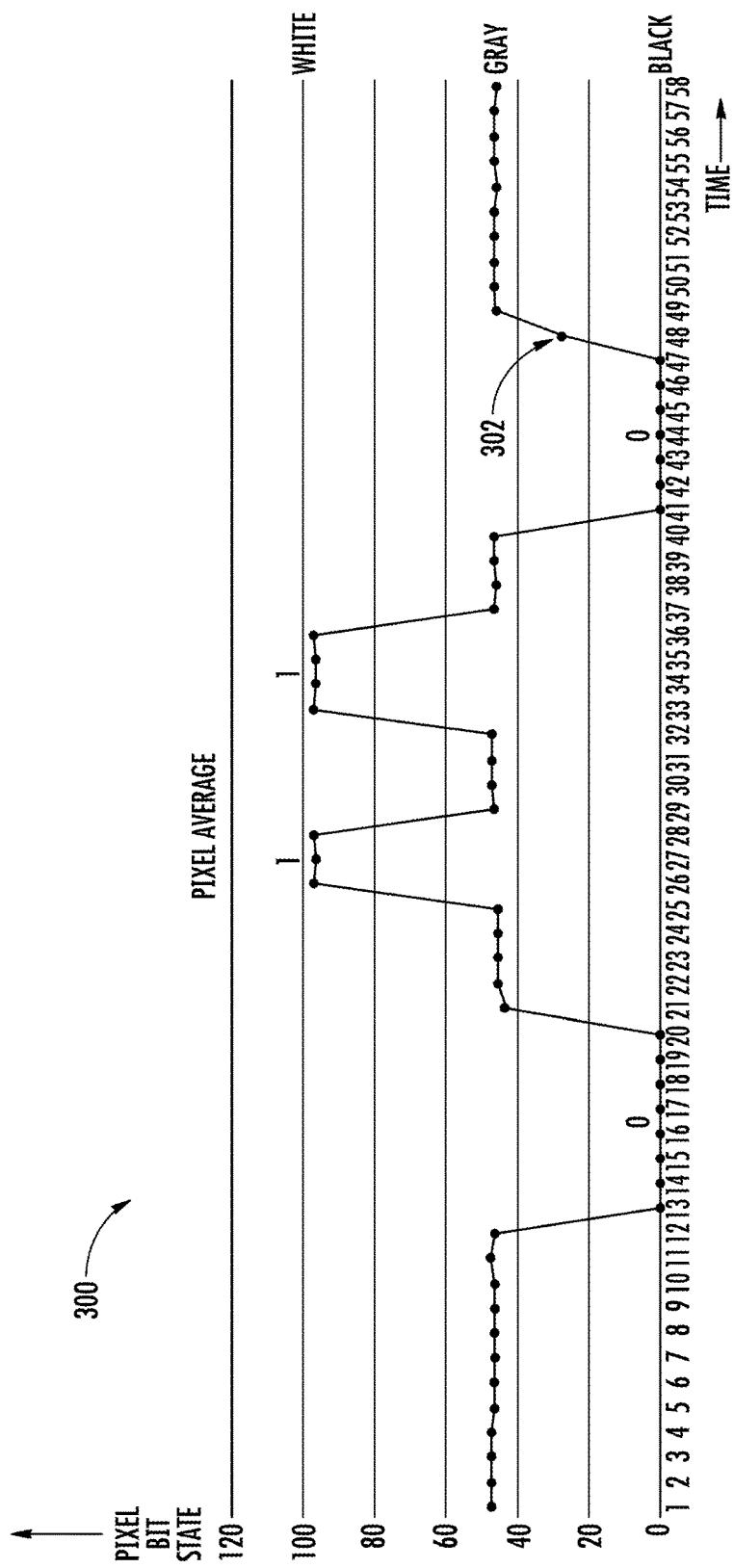
FIG. 3 illustrates another exemplary embodiment of the communication sequence that is produced by the scanner, after the communication sequence has been displayed on the computer screen.

FIG. 3 illustrates another exemplary embodiment of the communication sequence that is produced by the scanner, after the communication sequence has been displayed on the computer screen. The communication sequence 300 of the present invention may be simulated by turning the screen on, off, or to gray. The scanner can detect the value of the constant state with the following algorithm:

```
int Mat|rixPluginDecode(unsigned char *pBuffer, int width, int height) {
int iRow, iCol;
unsigned long ulSum, ulAvrg;
int MaxRow = 640; //# of vertical pixels
int MaxCol = 844; //# of horizontal pixels
ulAvrg = 0;
for (iRow = 0; iRow < MaxRow; iRow++) {
    ulSum = 0;
    for (iCol = 0; iCol < MaxCol; iCol++) {
        ulSum += pBuffer[iCol + iRow * MaxRow];
    }
    ulSum /= MaxCol;
    ulAvrg += ulSum;
}
ulAvrg /= MaxRow;
printf("%u\r\n", ulAvrg); //outputs pixel average value to host computer
}
```

In this code, snippet "ulAvrg" is the variable of interest; it may represent the pixel average values returned by an Xenon scanner of its entire sensor area, for a single acquisition. The resulting output of the scanner (i.e. all successive acquisitions) at the end of the experiment is then fed into a spreadsheet and displayed graphically, as shown FIG. 3. The pixel average values are shown on the Y-axis, and taken together in sequence, illustrate a "0110" bit pattern. The pixel average values are represented by a bit state measured on a scale from 0 to 255, where 0 represents "perfect black" and 255 represents "perfect white". This measurement is essentially the average value for all pixels of the sensor, where each individual pixel is encoded as an 8-bit value. In the aforementioned experiment, a "perfect white" was not achieved. Rather, a white frame was measured at approximately 100 bits state.

Figure 4:
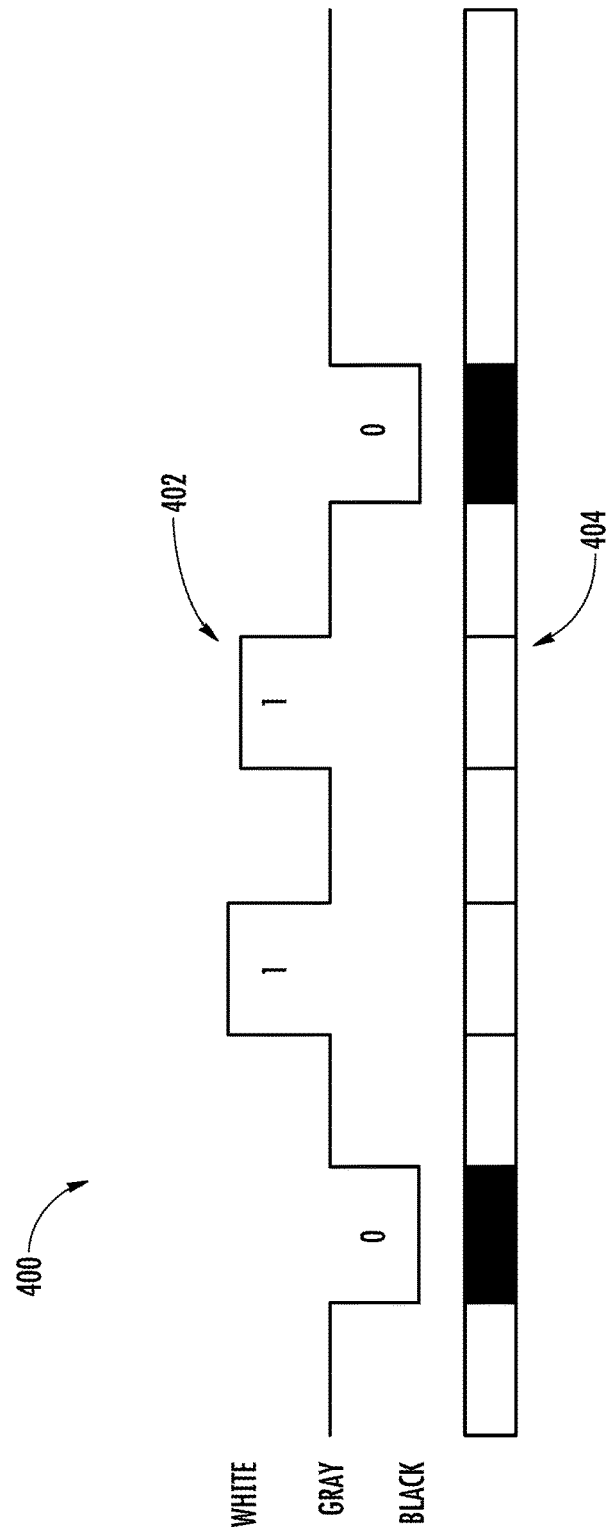
FIG. 4 illustrates yet another exemplary embodiment of the communication sequence that is displayed on the computer screen including the white-gray-black pattern displayed on the computer screen.

FIG. 4 illustrates yet another exemplary embodiment 400 of communication sequence 402 that is displayed on the computer screen including the white-gray-black pattern displayed on the computer screen. The present invention may be demonstrated utilizing the following devices: a standard Android tablet (e.g., Galaxy Tab 2 by Samsung) and a standard Xenon 1900 barcode scanner by Honeywell, with a black & white CMOS sensor. An Android application named AndroidScreenFlicker was created for the purpose of this experiment. The result of the experiment is illustrated in exemplary embodiment 400 of FIG. 4. The time-distributed pattern of communication sequence 402 is displayed, i.e. projected, on the LCD screen and alternates on the LCD screen of the tablet between the 3 defined color states i.e., the white-gray-black pattern 404. If each frame is approximately 17 ms, the user may not be able to observe the change in the white-gray-black pattern 404, and the LCD screen may appear gray during the projection of the communication sequence 402. The projection results in communication sequence 402 comprising the bits 0110 which may be the same as the bit pattern of FIG. 3. In this experiment, each time slot has a fixed 1-second duration, although other time periods may be selected for the experiment. The aforementioned Android application may be implemented on another OS, i.e., the application is OS agnostic.

In the experiment, special attention was taken to ensure that gray levels are effectively converted into a median value, and in this particular experiment the best performing color was Light Steel Blue. An example color may be html color code #B0C4DE, as defined at W3schools.com.

This experiment also highlights the importance of having an intermediate state (where all the pixels are Light Steel Blue or other intermediate color or half the screen illumination is on and half off creating a gray level to the scanner) since the scanner may capture an image at any given time including during the "rise" and the "fall" time of the LCD screen, as illustrated by indicator 302 in FIG. 3. The intermediate state creates a gray level that serves as a neutral or "rest" condition, and provides a mechanism for bit synchronization.

Figure 5:
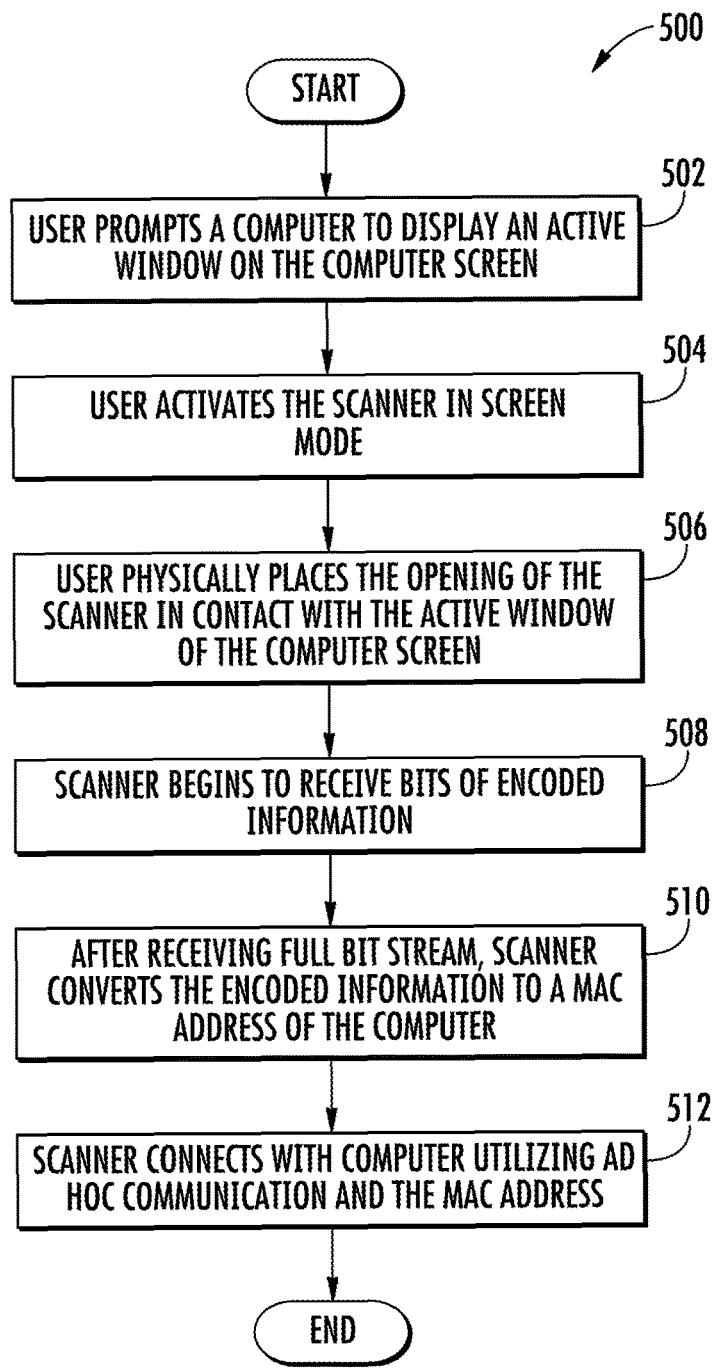
FIG. 5 is a flow diagram illustrating a method of receiving at a scanner the communication sequence that includes encoded information.

FIG. 5 is a flow diagram 500 illustrating a method of receiving at a scanner a communication sequence that includes encoded information. The method may comprises the steps of:

User prompts a computer to display an active window on the computer screen. (step 502) The prompting may include the user touching the "touch screen" of the computer. An active window on the computer screen changes light intensity uniformly to allow the scanner to be in contact with the screen and to operate in any focus condition, including out-of focus User activates the scanner in a screen mode. (step 504)

User physically places the opening of the scanner in contact with the active window of the computer screen (step 506

Scanner begins to receive bits of encoded information. (step 508) Reception of bits may begin essentially immediately after the scanner in placed in contact with the active window. The bits may be received via asynchronous communication.

After receiving a full bit stream, the scanner converts the encoded information to a unique identifier of the computer. The unique identifier may be a MAC address of the computer (step 510). After a successful reception and conversion of the bit stream, the scanner provides a positive notification to the user, such as turning on a light, generating a sound or causing a vibration.

Scanner connects with computer utilizing ad hoc communication and the MAC address. (step 512)

Scanners may have several embodiments of operation. In one embodiment, the scanner continuously scans for barcodes after the scanner is turned on. In another embodiment, the scanner only scans when a scan button (trigger) is depressed. Generally, for the scan button case, after a barcode is read, the scanner turns off. However, there may be modes where the scanning continues as long as the scan button is activated.

In another embodiment, if the barcode scan is not successful, the scanner may automatically switch to a screen mode where the scanner scans a communication sequence that is displayed on the screen.

Figure 6:
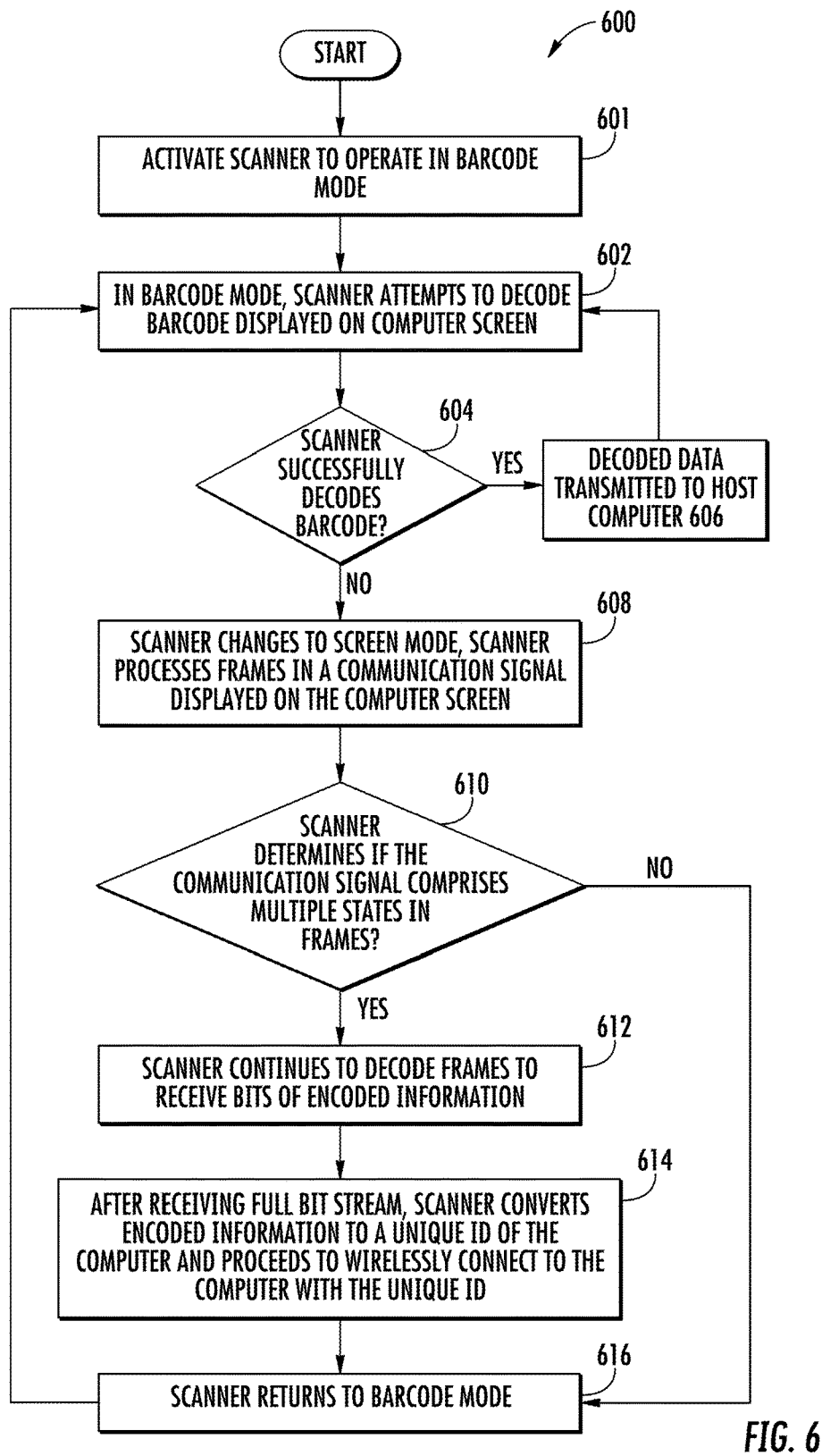
FIG. 6 is a flow diagram illustrating another method of receiving at a scanner the communication sequence that includes encoded information.

FIG. 6 is a flow diagram 600 illustrating another method of receiving at a scanner the communication sequence that includes encoded information. The method may comprises the steps of:

Activate a scanner to operate in barcode mode. (step 601)

In the barcode mode, the scanner attempts to decode a barcode displayed on computer screen. (step 602) For one embodiment of decoding, the scanner scans for contrast areas and then determines edges between high and low contrast.

Does the scanner successfully decode the barcode? (step 604) If the scanner does not successfully decode the barcode: (i) change the operation of the scanner to a screen mode and process a plurality of frames in a communication sequence displayed on the computer screen. (step 608) In one embodiment, several frames (e.g., six) are processed by averaging pixels.

The scanner determines if the communication sequence comprises multiple states in the frames of the communication sequence. (step 610) In one embodiment, there may be three states corresponding to black, gray, and white. In another embodiment there may be more than three states.

If the communication sequence comprises multiple states, the scanner continues to decode the plurality of frames comprising bits of encoded information. (step 612) After receiving and decoding a full bit stream, the scanner converts the encoded information to a unique ID of the computer, and then wirelessly connects to the computer using the unique ID. (step 614) The wireless connection may utilize Bluetooth technology. Subsequently, the operation of the scanner returns to the barcode mode. A full bit stream comprises all the bits contained between prolonged gray states that last for multiple frames. (step 616) In the barcode mode, if the scanner successfully decodes the barcode, the scanner transmits the decoded barcode to a host computer, and then the scanner repeats the operation in the barcode mode by attempting to decode another barcode. (steps 602, 604, 606)

In the screen mode, if the communication sequence does not comprise multiple states, the operation of the scanner returns to barcode mode. (steps 610, 616)

In summary, the computer may transmit its communication sequence with a unique identifier continuously in a loop in a designated area such as in the lower right corner of the computer screen. The user places the scanner in contact with the screen and makes an average reading of all or a portion of its sensor pixels during each frame of its scan time. The scanner records the bits and the long gray segment that indicates the start of the data until a full data transmission is obtained. The scanner may then unambiguously connect with the computer terminal, such as a CV61, using the acquired data. The present invention in a broad sense is a generic method of communication from a computer screen without the limitation of an in-focus optics system and in the presence of high environmental challenges such as direct sunlight or rain. The invention was inspired by observing the difficulties of a user in a package carrier environment when trying to read a bar code off the screen in the presence of direct sunlight. The present invention, therefore, is not limited to a specific application such as communicating a computer MAC address, but can be a method of communicating data for any purpose, including data collection.

The present invention allows the scanners already deployed to be used with only software modifications. With the present invention, a user may connect a common scanning device to a host computer in the presence of direct sunlight with a high confidence level of success.

To supplement the present disclosure, this application incorporates entirely by reference the following commonly assigned patents, patent application publications, and patent applications:

U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,818; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880; U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. D702,237; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,525; U.S. Pat. No. 8,794,526; U.S. Pat. No. 8,798,367; U.S. Pat. No. 8,807,431; U.S. Pat. No. 8,807,432; U.S. Pat. No. 8,820,630; U.S. Pat. No. 8,822,848; U.S. Pat. No. 8,824,692; U.S. Pat. No. 8,824,696; U.S. Pat. No. 8,842,849; U.S. Pat. No. 8,844,822; U.S. Pat. No. 8,844,823; U.S. Pat. No. 8,849,019; U.S. Pat. No. 8,851,383; U.S. Pat. No. 8,854,633; U.S. Pat. No. 8,866,963; U.S. Pat. No. 8,868,421; U.S. Pat. No. 8,868,519; U.S. Pat. No. 8,868,802; U.S. Pat. No. 8,868,803; U.S. Pat. No. 8,870,074; U.S. Pat. No. 8,879,639; U.S. Pat. No. 8,880,426;

U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;

U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of obtaining machine-readable code information with a barcode scanner from a digital display comprising the steps of:
   activating a barcode scanner to operate in a first mode;
   converting the machine-readable code information into a communication sequence comprising sequential images, wherein each sequential image is defined by at least three colors;
   configuring the barcode scanner to operate in a second mode, in case the machine-readable code information is not decoded, to analyze a plurality of images sequentially;
   displaying by the digital display the communication sequence;
   receiving with the barcode scanner the communication sequence, wherein the barcode scanner captures the sequential images;
   converting the captured sequential images back into the machine-readable code information; and
   connecting the barcode scanner to a computer using a unique identifier via an electronic communication method.

2. The method according to claim 1, wherein,
   the communication sequence comprises a sequence of three optical states including an "on" state, an "off" state, and an intermediate state, wherein, each optical state represents a different color;
   on an active window of the digital display, the "on" state is displayed as a white color, the "off" state is displayed as a black color, and the intermediate state is displayed as a gray color;
   at the "on" state or the "off" state, the communication sequence transitions to and from the intermediate state; and
   at the intermediate state, the communication sequence transitions to and from either the "on" state or the "off" state.

3. The method according to claim 2, wherein,
   the "on" state, the "off" state or the intermediate state have at least a duration of a barcode scanner frame rate.

4. The method according to claim 2, wherein,
   a transition from the intermediate state to the "on" or "off" state and back to a transition state comprises one bit of information; and
   a transmission period for one bit is equal to two times a frame duration plus two times a sum of a rise time plus a fall time.

5. The method according to claim 1, wherein,
   the communication sequence is displayed on a portion of a screen of the computer.

6. The method according to claim 1, wherein,
   the unique identifier of the computer is a MAC address.

7. The method according to claim 1, wherein,
   the electronic communication method utilizes a Bluetooth Low Energy (LE) technology.

8. A system for obtaining machine-readable code information with a barcode scanner from a digital display, the system comprising:
   a computer capable of generating a multi-state sequence from the machine-readable code information and presenting the multi-state sequence on the digital display;
   the barcode scanner capable of scanning the digital display and receiving the multi-state sequence using out-of-focus asynchronous data transmission, wherein, the barcode scanner converts the multi-state sequence back into the machine-readable code information, and wherein the barcode scanner detects a magnitude of the multi-state sequence by averaging pixels of the digital display and asynchronously communicated with the computer; and
   the digital display for displaying the multi-state sequence.

9. The system according to claim 8, wherein,
   the multi-state sequence comprises a sequence of three optical states including an "on" state, an "off" state, and an intermediate state.

10. The system according to claim 9, wherein,
    on a screen of the computer, the "on" state is displayed as a white color, the "off" state is displayed as a black color, and the intermediate state is displayed as a gray color.

11. The system according to claim 9, wherein,
    at the "on" state or the "off" state, the multi-state sequence transitions to and from the intermediate state.

12. The system according to claim 9, wherein,
    at the intermediate state, the multi-state sequence transitions to and from either the "on" state or the "off" state.

13. The system according to claim 9, wherein,
    a transition from the intermediate state to the "on" or "off" state and back to a transition state comprises one bit of information.

14. The system according to claim 9, wherein,
a transmission period for one bit is equal to two times a frame duration plus two times a sum of a rise time plus a fall time.

15. The system according to claim 8, further comprising coupling the barcode scanner to the computer using the machine-readable code information.

16. The system according to claim 8, wherein,
the barcode scanner operates in a direct sunlight environment.

17. The system according to claim 8, wherein,
the multi-state sequence comprises a sequence of more than three optical states.

18. A method of communicating with a computer, comprising:
activating a scanner to operate in a barcode mode;
attempting, by the scanner, to decode a barcode displayed on a computer screen;
if the scanner does not successfully decode the barcode:
changing an operation of the scanner to a screen mode, and
processing a plurality of frames of a communication sequence displayed on the computer screen;
determining, by the scanner, if the communication sequence comprises multiple states in the plurality of frames of the communication sequence;
if the communication sequence comprises multiple states, continuing, by the scanner, to decode the plurality of frames comprising bits of encoded information; and
after receiving and decoding the communication sequence, returning the operation of the scanner to the barcode mode.

19. The method according to claim 18, further comprising:
converting, by the scanner, the bits of encoded information to a unique ID of the computer, and wirelessly connecting to the computer using the unique ID.

* * * * *